Aug. 12, 1941.  B. L. MILLS  2,252,194
WHEEL
Filed Aug. 25, 1939   2 Sheets-Sheet 2
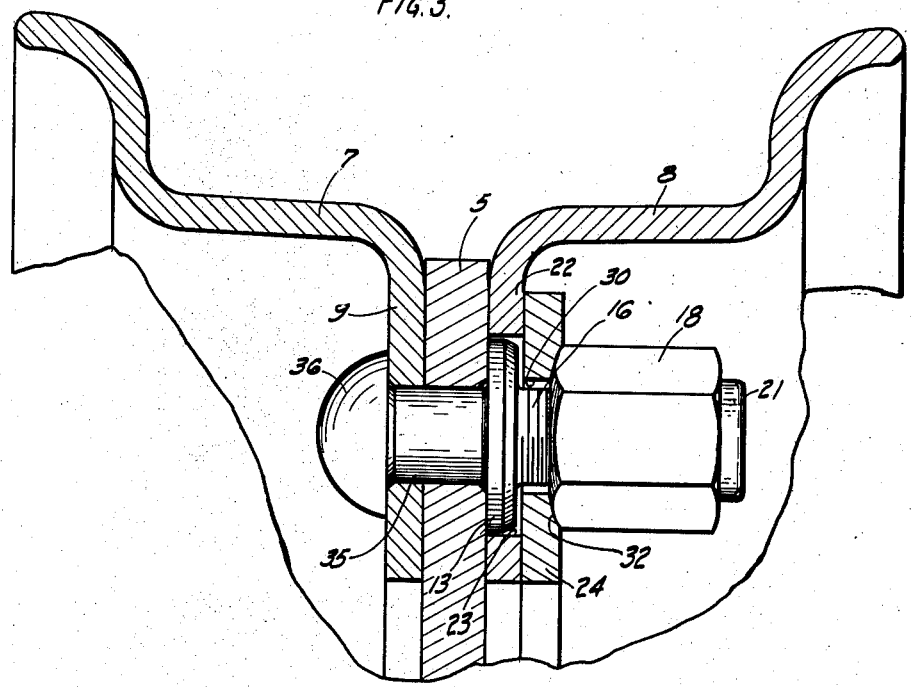
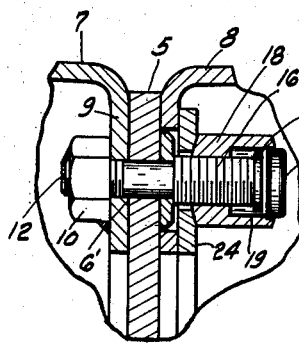
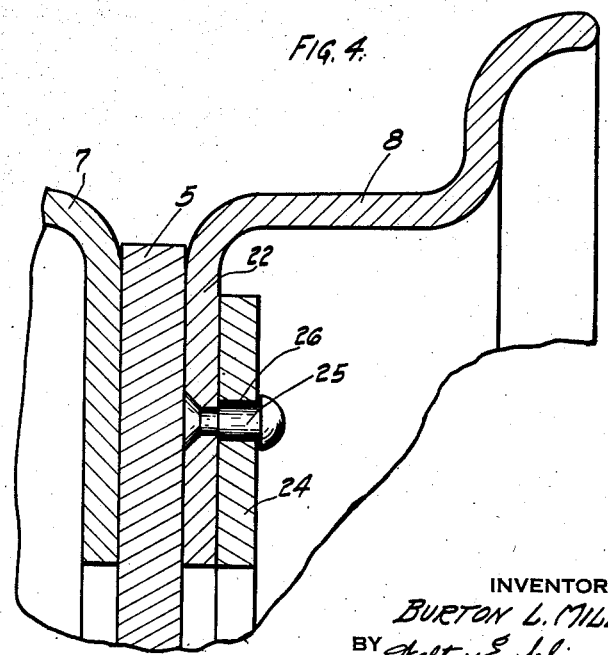
INVENTOR
BURTON L. MILLS.
BY Walter E. Schirmer
ATTORNEY Patented Aug. 12, 1941

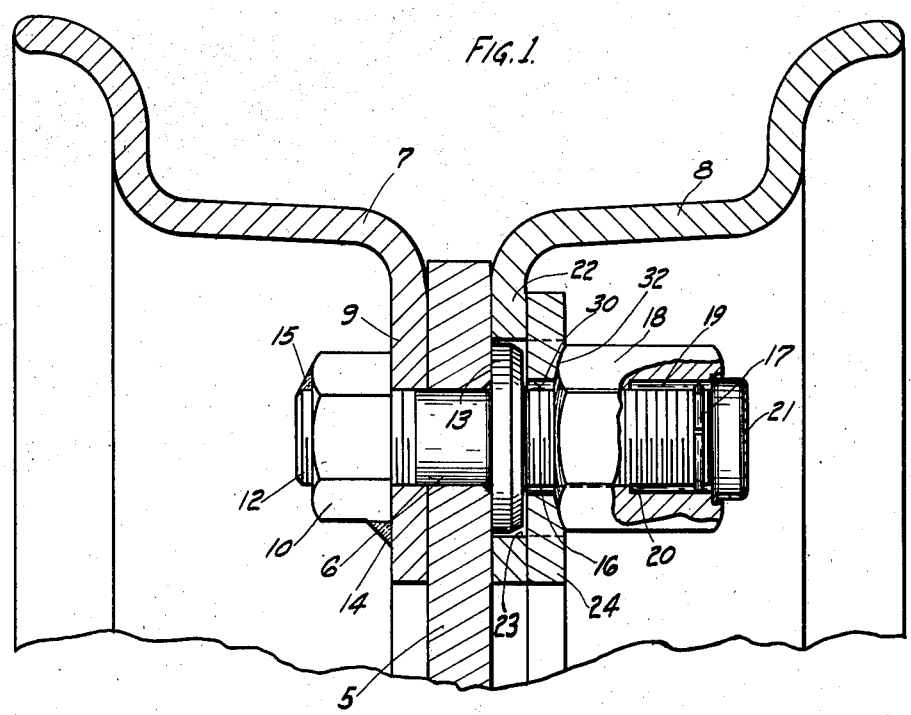
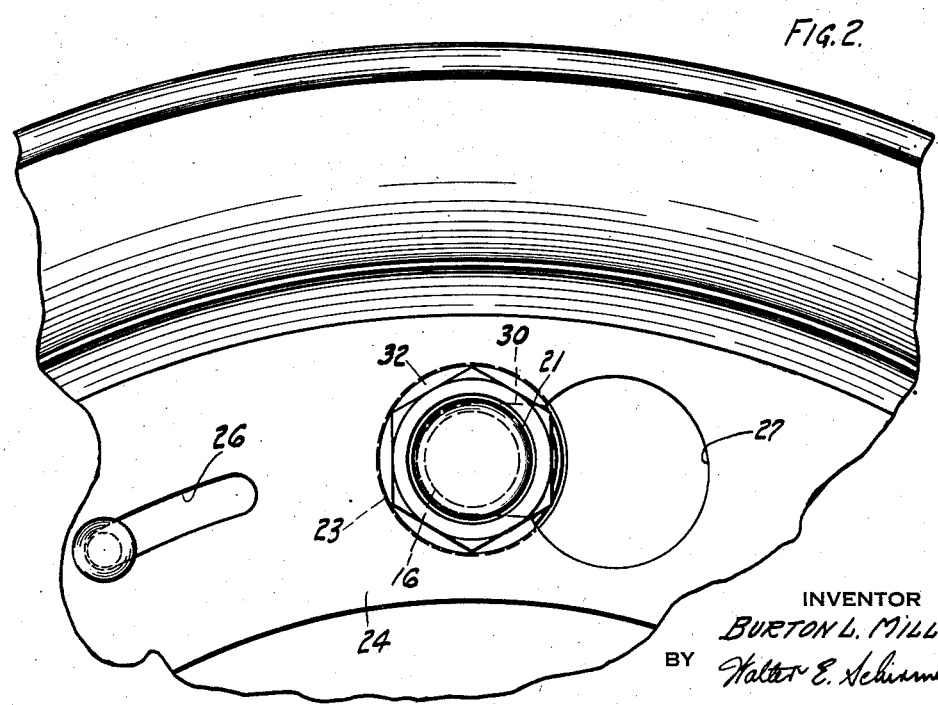

2,252,194

UNITED STATES PATENT OFFICE 2,252,194

WHEEL

Burton L. Mills, Buchanan, Mich., assignor to Clark Equipment Company, Buchanan, Mich., a corporation of Michigan Application August 25, 1939, Serial No. 291,862

3 Claims. (Cl. 152—409)

The present invention is concerned primarily with the provision of a wheel construction especially adapted for use where relatively wide tires are to be employed for travelling over rough terrain, such as used in sand or on ordnance equipment adapted to be moved across country, the tires having tubes of semi-solid construction in which the base portion is appreciably thickened to prevent complete collapse of the tire in case of blowouts.

With the use of such wide tires it becomes desirable to provide a rim formed in two complementary sections, these rim sections being secured to a disc forming a wheel body or to a radially directed hub flange in such manner that one of the sections is more or less permanently secured to the flange, while the other section is detachably secured thereto to facilitate changing of the tire in case of punctures or blowouts.

However, with a split rim construction of this type it is essential that some means be provided for safeguarding the operator when the tire is to be removed from the rim so as to prevent possible injury due to one of the rim sections being violently forced away from the supporting flange when the clamping means is released by reason of air pressure within the tire.

It is therefore a primary object of the present invention to provide a wheel construction in which the detachable rim section is provided with means which interlocks it against removal from the supporting flange when the clamping means is loosened, unless all of the pressure within the tire has been relieved.

Another object of the present invention is to provide means carried by the detachable rim section which allows this rim section to be mounted over the clamping means on the supporting flange, but can be locked against removal from the clamping means unless all of the pressure within the tire has been released.

In a preferred form of the present invention the detachable rim section is provided with means rotatably mounted thereon cooperating with a series of clamping studs having nonremovable nuts. The assembly is so arranged that it can be passed over the nuts into proper position and the rotatable means can then be moved into position so that the assembly is locked when the clamping nuts are tightened. Upon loosening of the clamping nuts the rotatable means will prevent removal of the rim section so long as there is any pressure within the tire tending to force the detachable section against the clamping nuts, the rotatable means being capable of movement to detaching position only when the tire pressure has been substantially exhausted.

Another feature of the present invention is the provision of a relatively simplified wheel assembly in which the two rim sections can be formed substantially as identical sections by a rolling operation, and the supporting flange can be formed integral with the hub or as a disc bolted to the hub and which at its periphery is provided with the clamping means for securing the rim sections thereto. It will be seen that with such a construction material advantages are produced in that the rim sections and supporting flange can be economically formed and the entire assembly can be easily and quickly put together by relatively unskilled operators.

Other objects and advantages of the present invention will appear more fully from the following detailed description which, taken in conjunction with the accompanying drawings, will disclose to those skilled in the art the particular construction and operation of preferred forms of the invention.

In the drawings:

Figure 1 is a partial transverse section through a wheel assembly embodying the present invention;

Figure 2 is a partial elevational view of the assembly shown in Figure 1;

Figure 3 is a view corresponding to Figure 1 with a modified stud mounting arrangement;

Figure 4 is a sectional view showing the mounting of the locking means on the rim section; and Figure 5 is a fragmentary sectional view of a still further modified stud arrangement.

Considering now Figures 1, 2 and 4 in detail, a radially directed supporting flange 5 is provided which may be formed integral with the hub, or may be formed as a disc bolted or otherwise suitably secured to a hub. Adjacent the outer periphery of the flange 5 there is provided a circumferential series of studs 6, these studs passing transversely through the disc.

A pair of complementary tire rim sections 7 and 8 are provided, which sections may be rolled or otherwise suitably formed. The section 7 is provided with a radially inwardly directed flange 9 having a circumferential series of apertures adapted to pass over the shank portion of the stud 6 and to be more or less permanently secured thereto by the nut 10 which is drawn up on the threaded portion 12 of the stud to clamp the flange 9 against the flange 5, the stud being provided with the shoulder portion 13 which is pressed against the opposite face thereof when the nut 10 is tightened.

After the rim section 7 has thus been secured to the flange 5, the nut is preferably locked against removal by welding the same to the flange 9, as indicated at 14, and also by welding the nut to the threaded portion 12 of the stud, as indicated at 15.

This provides for permanent attachment of the rim section 7 to the flange 5, it being obvious that if it is necessary to remove the rim section 7 for any reason, the welding spots 14 and 15 can be knocked off to allow removal of the nut 10.

Projecting axially outwardly beyond the shoulder 13 the stud is provided with a threaded portion 16 which, adjacent its outer end, is grooved to receive the ring 17 which seats in the groove and projects partially beyond the threads of the portion 16. Mounted on the threaded portion 16 of the studs are clamping nuts 18 which have axially recessed portions 19 allowing the nut to move axially over the ring 17 but preventing complete removal of the nut by reason of the abutment of the shoulder 20 against the ring 17 when the nut is rotated axially outwardly. The end of the nut is preferably closed by means of a suitable disc or plug 21 to prevent the entrance of dirt or foreign materials into the recess 19.

The rim section 8 is provided with the radially inwardly directed flange portion 22 which has a series of circumferential apertures 23 of a diameter such as to fit over the nuts 18, and also about the shoulder 13, thereby allowing the flange face of the flange 22 to move up against the face of the flange 5.

Secured to the outer radial face of the flange 22 is a planar ring like member 24, which member is mounted for limited relative rotation with respect to the flange 22 by means of the rivets 25, these rivets being secured in the flange 22 and having projecting shank portions engaging in the circumferentially directed slots 26 formed in the member 24. It will be seen that with this construction, the member 24 has limited rotation relative to the flange 22 between opposite extremities of the slots 26, it being understood that a plurality of rivets and cooperating slots are provided.

Intermediate the slots 26 the member 24 is provided with a series of circumferentially spaced apertures 27 which are of a diameter corresponding to the apertures 23 of the flange 22 so that when the ring is rotated in a counter-clockwise direction, as viewed in Figure 2, the apertures 22 move into alinement with the apertures 23 to allow the rim section 8 to be movable axially over the nuts 18 into position against the face of the flange 5.

When thus positioned, the member 24 is rotated into the position shown in Figure 2 which moves the elongated reduced opening 30 of the member 24 into position about the stud 16, the opening 30 being of such diameter as to engage under the inner face of the nut 18 to provide a spherical seat 32 between the nut 18 and the member 24. This seat is of sufficient area so that as the nut 18 is tightened, it bears against the member 24 and thereby forces the flange 22 tightly against the flange 15 to securely lock the rim section 8 in position.

When it is desired to remove the rim section 8, for example to change a tire, the nuts 18 are threaded outwardly, being limited in their outward movement by engagement of the shoulder 20 with the ring 17. However, if there is air pressure within the tire carried by the rim sections 7 and 8, this will force the rim section 8 to follow along with the nut 18, retaining the bearing engagement between the inner face of the nut and the seat 32 of the member 24. So long as this pressure remains in the tire it is not possible to remove the member 24 out of the position shown in Figure 2, and consequently the rim section 8 cannot be forced over the clamping means, thereby preventing the possibility of injury to the operator.

If the tire pressure is entirely relieved, there is then sufficient play between the flange 22 and the member 24 to allow this member to be forced away from the inner face of the nut 18 to an extent such as to allow it to rotate in a counter-clockwise direction, thereby alining the opening 27 in the member 24 with the opening 23 in the member 22. Upon alinement of these openings the entire rim section, together with the member 24, can be passed axially outwardly over the clamping nuts 18, thereby allowing removal of the rim section 8.

It is therefore apparent that with the construction shown, the rim section 8 is positively locked against removal from the flange 5 and the stud 6 until the entire pressure within the tire has been removed, under which conditions the member 24 can be rotated relative to the flange 22 to provide for such removal.

In Figure 3 I have shown a modified form of stud 35, this stud being adapted to have the shoulder portion 13 thereof forced against one face of the flange 5 with the shank portion to the left of the shoulder 13 extending through the flange 5 and through the corresponding opening in the flange 9 of the rim section 7. When the rim section 7 has thus been positioned against the flange 5 the end of the stud is riveted over, as indicated at 36, thereby positively and permanently securing the rim section 7 in position on the flange 5. To remove the rim section 7 under such conditions, it is necessary to shear off the head 36 of the stud 35.

The rim section 8 in this form of the invention is identical with that described in Figures 1 and 2 and carries the member 24 which cooperates with the clamping nuts 18 in the manner described in connection with Figures 1 and 2.

In Figure 5 I have shown a still further modified form of stud arrangement in which the rim sections and the ring 24 remain the same, as described in connection with Figures 1 to 4, but the stud 6' is provided with the extending threaded portion 16' for receiving the clamping nut 18 having the axial recess 19 therein. However, the threaded portion 16' of the stud 6' in this form of the invention terminates in a radially enlarged flange portion 40 which forms a stop for limiting the axial outward movement of the nut 18 from the threaded portion 16', and prevents the nut from being removed from the stud. The nut 18 cooperates with the ring 24 to secure the rim section 8 in position and provides for its detachment in the same manner as described in connection with Figures 1 to 4.

It is believed apparent that from the foregoing description, the wheel construction described herein presents many advantages over other types of constructions insofar as economy of manufacture and assembly is concerned, and also in providing adequate safeguards to eliminate any possibility of injury to the operator if he should attempt to remove the rim section 8 without first completely deflating the tire.

I therefore do not intend to be limited to the exact details herein shown and described, but only insofar as defined by the scope and spirit of the appended claims.

I claim:

1. In a wheel having a radially directed supporting flange, a first tire rim section permanently secured to one face of said flange, a second complementary tire rim section, a pneumatic tire thereon, studs on said flange having axially shiftable non-removable nuts, said second rim section having apertures therein adapted to pass axially over said nuts, rotatable means mounted on said second rim section adapted in one position to accommodate said movement over said nuts and in a second position to prevent movement of said second rim section relative to said nuts, said nuts and rotatable means having cooperating engaging surfaces operable when in said second position to prevent rotation of said rotatable means into said first position whenever there is any substantial pressure in said tire tending to axially spread said rim sections.

2. In a wheel for a pneumatic tire having a disc portion provided with a circumferential series of studs having non-removable nuts thereon, a partial rim section permanently secured to one side of said disc portion by said studs, a complementary rim section having a circumferential series of openings adapted to be received over said nuts, a ring secured to and having limited rotation relative said complementary section and provided with apertures adapted when alined with said openings to pass over said nuts, said ring being rotatable into locking position to prevent detachment of said section, and interengaging surfaces between said ring and nuts preventing rotation of said ring toward alining position upon loosening of said nuts whenever there is any substantial pressure in said tire, said interengaging surfaces comprising a spherical seating surface on the inner end of said nut and a corresponding spherical recess in said ring adapted to be engaged by said nut end when said ring is rotated into locked position.

3. In a wheel for a pneumatic tire having a disc provided with a circumferential series of studs having non-removable nuts thereon, a partial rim section permanently secured to one side of said disc by said studs, a complementary rim section having a circumferential series of openings adapted to be received over said nuts, a ring member having pin and slot connection to said second rim section providing for limited rotation thereof relative said section but preventing axial separation therebetween, said ring having a circumferential series of openings adapted when alined with said rim section openings to pass over said nuts, said ring having circumferential slots defined at the remote end by spherically recessed surfaces leading from said openings, and adapted, when said ring is rotated to locked position, to engage behind said nuts for preventing detachment of said second rim section, and spherical inner ends on said nuts seating in said recesses to prevent rotation of said ring into unlocking position so long as there is any axial outward pressure on said second rim section.

BURTON L. MILLS.